(12) United States Patent
Uezono

(10) Patent No.: US 9,281,512 B2
(45) Date of Patent: Mar. 8, 2016

(54) METHOD FOR PRODUCING AQUEOUS ELECTRODE PASTE AND TWO-SHAFT KNEADER

(71) Applicant: Tomoyuki Uezono, Toyota (JP)

(72) Inventor: Tomoyuki Uezono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 207 days.

(21) Appl. No.: 14/072,076

(22) Filed: Nov. 5, 2013

(65) Prior Publication Data

US 2014/0131625 A1    May 15, 2014

(30) Foreign Application Priority Data

Nov. 9, 2012   (JP) ................................. 2012-247669

(51) Int. Cl.
*H01M 4/88*   (2006.01)
*H01M 4/04*   (2006.01)

(52) U.S. Cl.
CPC ...................................... *H01M 4/04* (2013.01)

(58) Field of Classification Search
CPC ....... H01M 4/04; H01M 4/0404; H01M 4/13; H01M 4/139
USPC ................................................ 252/182.1, 500
See application file for complete search history.

(56) References Cited

FOREIGN PATENT DOCUMENTS

| JP | A-2005-222772 | 8/2005 |
| JP | 2012-018785 A | 1/2012 |
| JP | 2012-129126 A | 7/2012 |
| JP | 2012-236159 A | 12/2012 |

*Primary Examiner* — Khanh Tuan Nguyen
(74) *Attorney, Agent, or Firm* — Oliff PLC

(57) ABSTRACT

A method for producing an aqueous electrode paste includes charging a powder made of an active material and a thickener and an aqueous solvent inside of a two-shaft kneader, and, using the two-shaft kneader, thickly kneading the powder and the aqueous solvent to generate a mixture; and charging a misty aqueous solvent having an average liquid droplet diameter of 1 μm or more and an average particle diameter (D50) of the thickener or less inside of the two-shaft kneader by spraying, and using the two-shaft kneader, diluting the mixture with the charged aqueous solvent.

4 Claims, 11 Drawing Sheets

500 μm

MAXIMUM COATING DEFECT

MAXIMUM COATING DEFECT

MAXIMUM COATING DEFECT

500 μm

MAXIMUM COATING DEFECT

MAXIMUM COATING DEFECT

500 μm

MAXIMUM
COATING DEFECT

MAXIMUM COATING DEFECT

FIG. 11

| | KNEADER | SOLVENT CHARGE | | NUMBER OF COATING DEFECTS [defects/m] | MAXIMUM DEFECT SIZE [μm] | DETER- MINATION |
|---|---|---|---|---|---|---|
| | | THICK KNEADING | DILUTION | | | |
| FIRST EXAMPLE | TWO-SHAFT KNEADER | ROD-LIKE | MISTY | 1 | 80 | ○ |
| SECOND EXAMPLE | TWO-SHAFT KNEADER | MISTY | MISTY | 1 | 70 | ○ |
| FIRST COMPARATIVE EXAMPLE | PLANETARY MIXER | EN BLOC | EN BLOC | 67 | 230 | × |
| SECOND COMPARATIVE EXAMPLE | TWO-SHAFT KNEADER | ROD-LIKE | ROD-LIKE | 89 | 260 | × |
| THIRD COMPARATIVE EXAMPLE | TWO-SHAFT KNEADER | MISTY | ROD-LIKE | 75 | 140 | × |
| FOURTH COMPARATIVE EXAMPLE | TWO-SHAFT KNEADER | ROD-LIKE | SHOWER-LIKE | 32 | 160 | × |
| FIFTH COMPARATIVE EXAMPLE | TWO-SHAFT KNEADER | MISTY | SHOWER-LIKE | 30 | 190 | × |

METHOD FOR PRODUCING AQUEOUS ELECTRODE PASTE AND TWO-SHAFT KNEADER

INCORPORATION BY REFERENCE

The disclosure of Japanese Patent Application No. 2012-247669 filed on Nov. 9, 2012 including the specification, drawings and abstract is incorporated herein by reference in its entirety.

BACKGROUND OF THE INVENTION

1. Field of the Invention

The invention relates to a method for producing an aqueous electrode paste, which includes thickly kneading a powder including an active material and a thickener and an aqueous solvent to form a mixture and diluting the mixture with an aqueous solvent to produce an aqueous electrode paste, and a two-shaft kneader.

2. Description of Related Art

As a power generating element of a battery, an electrode body that is obtained by laminating or winding a positive electrode, a negative electrode, and a separator and is impregnated with an electrolytic solution is used. The positive electrode and negative electrode are formed by forming coated films by coating electrode pastes for positive electrode and negative electrode on a positive electrode current collector and a negative electrode current collector, drying, and pressing the coated films.

The electrode paste is produced in such a manner that an active material, a thickener, and a solvent are thickly kneaded to form a mixture, the mixture is diluted with a solvent, and thereafter a binder is added to the diluted mixture. Thick kneading, dilution, and addition of a binder are performed using a kneader such as a planetary mixer, for example. A kneading machine kneads an active material, a thickener, a solvent and a binder that are charged en bloc respectively during thick kneading, diluting, and addition of the binder by rotation of a stirring blade. In this case, the electrode paste attached to the stirring blade has to be scraped off with a paddle during kneading. Therefore, the working hours increase, thus increasing the direct labor cost.

According to a technology disclosed in Japanese Patent Application Publication No. 2005-222772 (JP 2005-222772 A), an electrode paste is produced using a continuous two-shaft kneader in which to two rotary shafts rotatably supported by a hollow barrel, screws and paddles are provided. According to the technology disclosed in Japanese Patent Application Publication No. 2005-222772 (JP 2005-222772 A), a powder (active material and thickener) and a solvent charged inside of the barrel are conveyed with a screw, and thickly kneaded by rotation of the paddle. Thereafter, according to the technology disclosed in Japanese Patent Application Publication No. 2005-222772 (JP 2005-222772 A), a mixture of a powder and a solvent is diluted with a solvent further charged inside of the barrel to produce an electrode paste.

As the electrode paste, from the viewpoint of material cost and reduction of waste that is generated during production, an aqueous electrode paste that uses an aqueous solvent such as ion-exchange water is used. In this case, as the thickener, for example, CMC (carboxymethylcellulose) is used. The thickener except a part thereof absorbs the aqueous solvent during thick kneading and swells. That is, a part of the thickener absorbs an aqueous solvent during dilution to swell.

In the technology disclosed in Japanese Patent Application Publication No. 2005-222772 (JP 2005-222772 A), in what state the aqueous solvent is charged is not specifically disclosed. In general, it is considered to charge a rod-like (that is, a state that is not microparticulated) aqueous solvent through an orifice plate. When such a rod-like aqueous solvent was charged as a solvent used during dilution, insoluble cellulose contained in a part of the thickener rapidly swells and may generate microgel having a large size. As a result thereof, the microgel may not be sufficiently pulverized by rotation of the barrel.

That is, in the above example, when the aqueous electrode paste is produced, many microgels larger than a thickness of a coated film remain in the aqueous electrode paste. Therefore, in the coated film, many coating defects such as lack of hiding where the coated film is not present and pin holes are generated. This is the same also when an aqueous solvent is charged en bloc in a kneader such as the planetary mixer. Therefore, when the aqueous electrode paste is produced according to the example, a yield of batteries is degraded.

Further, when the aqueous electrode paste is produced according to the example, the maximum size of the coating defects becomes larger. Therefore, due to lithium precipitation, an increase in the battery resistance may occur.

SUMMARY OF THE INVENTION

The invention provides a method for producing an aqueous electrode paste which can reduce a size of microgels in the aqueous electrode paste and a two-shaft kneader.

A first aspect of the invention relates to a method for producing an aqueous electrode paste. The method for producing the aqueous electrode paste include: charging a powder made of an active material and a thickener and an aqueous solvent inside of a two-shaft kneader, and, using the two-shaft kneader, thickly kneading the powder and the aqueous solvent to generate a mixture; and charging a misty aqueous solvent having an average liquid droplet diameter of 1 µm or more and an average particle diameter (D50) of the thickener or less inside of the two-shaft kneader by spraying, and, using the two-shaft kneader, diluting the mixture with the charged aqueous solvent.

A second aspect of the invention relates to a two-shaft kneader. The two-shaft kneader includes: a thickly kneading zone where a powder made of an active material and a thickener and an aqueous solvent are charged inside of a hollow exterior, and, by rotating two rotary shafts supported by the hollow exterior in a parallel state with a predetermined distance separated from each other, the powder and the aqueous solvent are thickly kneaded to generate a mixture; a diluting zone where an aqueous solvent is charged inside of the exterior, by rotating the respective rotary shafts, the mixture is diluted with the charged aqueous solvent; and a first spray that is provided to the diluting zone and sprays the aqueous solvent for diluting the mixture in a misty state which has an average liquid droplet diameter of 1 µm or more and an average particle diameter (D50) of the thickener or less inside of the exterior.

The first and second aspects of the invention exert an effect that a size of the microgels in the aqueous electrode paste can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 11 is a diagram showing evaluation results of coating defects.

DETAILED DESCRIPTION OF EMBODIMENTS

Hereinafter, a method for producing an aqueous electrode paste of the embodiment and a two-shaft kneader 1 will be described.

Figure 1:
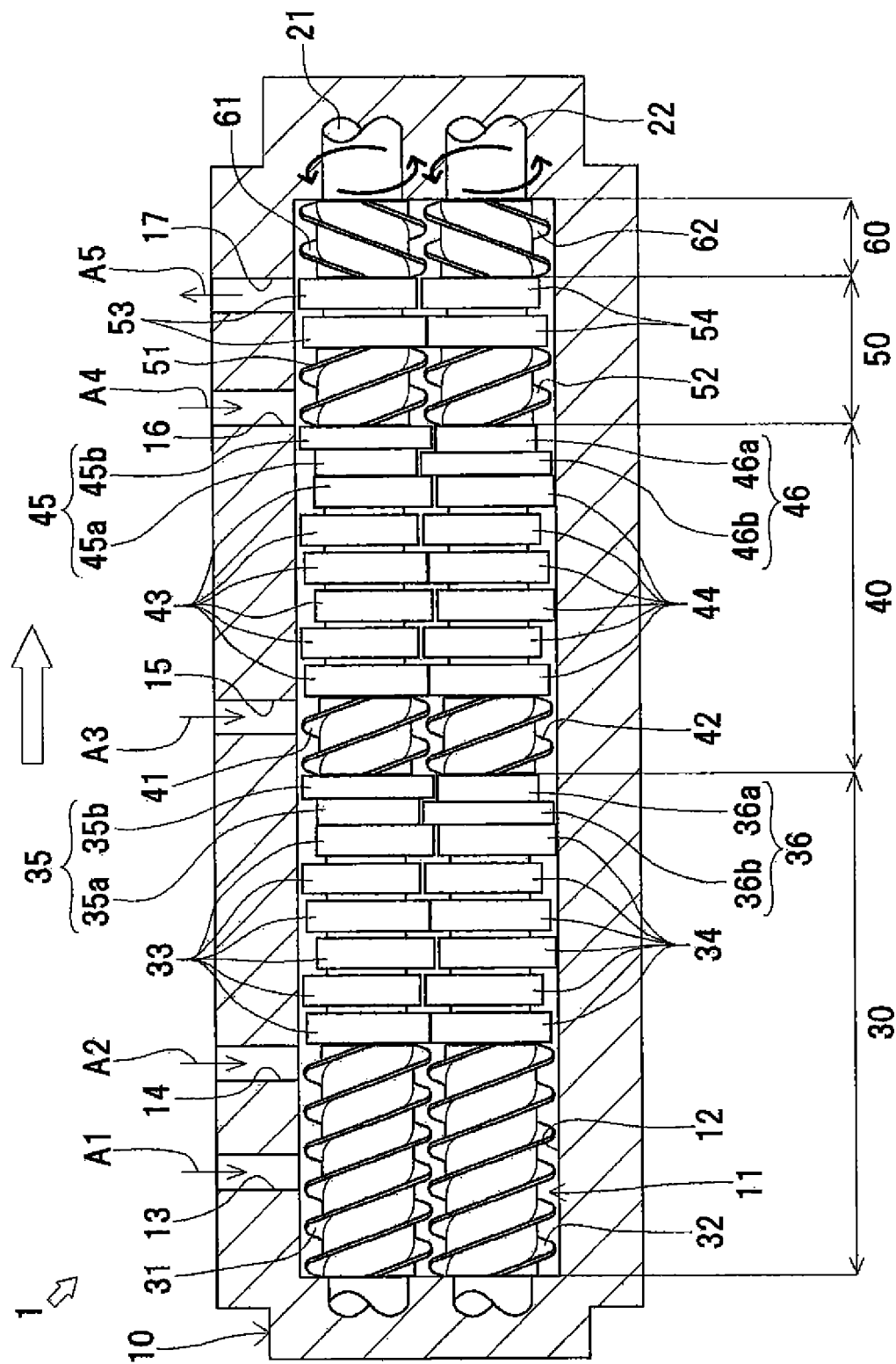
FIG. 1 is a partial cross sectional view showing a structure of a two-shaft kneader of an embodiment of the invention.

As shown in FIG. 1, a method for producing an aqueous electrode paste of the embodiment is used to produce an aqueous electrode paste AS for positive electrode and negative electrode by kneading a powder A1 made of an active material and thickener, aqueous solvents A2, A3, and a binder A4 using a two-shaft kneader 1. For the convenience of description, a method for producing an aqueous electrode paste of the embodiment is used to produce an aqueous electrode paste for a negative electrode.

Hereinafter, for the convenience of description, a direction from a left direction on the page toward a right direction on the page in FIG. 1 is taken as "a conveyance direction of a two-shaft kneader 1" (see an arrow mark shown on the page of FIG. 1). Further, a vertical direction on the page in FIG. 1 is taken as a "vertical direction of a two-shaft kneader 1".

The two-shaft kneader 1 is provided with a housing 10 and two rotary shafts 21, 22.

The housing 10 is a hollow member forming an exterior of the two-shaft kneader 1, and the hollow part is a kneading chamber 11.

The kneading chamber 11 has, when seen from the conveyance direction, a shape where two true circles are partially overlapped, and extends along the conveyance direction from an upstream side to a downstream side of the housing 10 with the shape maintained. At a center of curvature of each circle part in the kneading chamber 11, rotary shafts 21, 22 above and below are located respectively.

The rotary shafts 21, 22 above and below are supported rotatably by the housing 10 along an up and down direction (a direction orthogonal to an axial direction) in parallel with a predetermined distance separated from each other. Axial directions of the rotary shafts 21, 22 above and below and a conveyance direction are in parallel. Each of the rotary shafts 21, 22 above and below is connected with predetermined drivers and, when the drivers are driven, is rotated in an arrow direction shown in a right end on the page of FIG. 1.

The two-shaft kneader 1 supports members such as conveyance screws 31, 32 and paddles 33, 34 by the rotary shafts 21, 22 above and below. Thus, in the kneading chamber 11, a thickly kneading zone 30, a diluting zone 40, a binder mixing zone 50, and a return zone 60 are formed.

Members such as the conveyance screw 32 and the paddle 34 supported by the rotary shaft 22 on the lower side have shapes the same as those of members such as the conveyance screw 31 and the paddle 33 supported by the rotary shaft 21 on the upper side. Therefore, hereinafter, description of shapes of members such as the conveyance screw 32 and the paddle 34 supported by the rotary shaft 22 on the lower side will be omitted.

The thickly kneading zone 30 is a part where the powder A1 and the aqueous solvent A2 are kneaded to generate a mixture including the powder A1 and the aqueous solvent A2. The thickly kneading zone 30 is formed at an end on an upstream side of the kneading chamber 11. The thickly kneading zone 30 is provided with the conveyance screw 31, six paddles 33, and a resistance paddle 35 supported by the rotary shaft 21 on the upper side, and the conveyance screw 32, six paddles 34, and a resistance paddle 36 supported by the rotary shaft 22 on the lower side.

The conveyance screw 31 on the upper side has a spiral blade part, and is supported concentrically with the rotary shaft 21 on the upper side so as to cover an outer periphery of the rotary shaft 21 on the upper side. The conveyance screws 31, 32 above and below are disposed so as to face each other with positions in mutual axial directions (conveyance direction) matched and do not come into contact with each other at the time of rotation of the rotary shafts 21, 22 above and below.

The paddle 33 on the upper side is formed in a shape obtained by truncating an apex part of a triangle when seen from the conveyance direction and supported concentrically with the rotary shaft 21 on the upper side so as to cover an outer periphery of the rotary shaft 21 on the upper side. In the two paddles 33 on upper side abutting on each other in the conveyance direction, the paddle 33 on the downstream side is disposed by displacing its phase with respect to the paddle 33 on the upstream side. The paddles 33, 34 above and below are disposed so as to face with positions of mutual shaft directions matched, and facing ones are in the same phase. Further, the paddles 33, 34 above and below do not come into contact with each other during rotation of the rotary shafts 21, 22 above and below.

The resistance paddle 35 on the upper side is supported concentrically with the rotary shaft 21 on the upper side so as to cover an outer periphery of the rotary shaft 21 on the upper side and disposed at an end on the downstream side of the thickly kneading zone 30. The resistance paddle 35 on the upper side is formed in a stepped substantial disc shape where a downstream side protrudes outward in a radial direction. In the resistance paddle 35 on the upper side, a small disc part 35a and a large disc part 35b are formed.

The small disc part 35a is a disc part on the upstream side of the resistance paddle 35. A thickness (a length in the axial direction) of the small disc part 35a is slightly larger than a thickness of the large disc part 35b.

The large disc part 35b is a disc part on the downstream side of the resistance paddle 35, that is, a part protruding outward in the radial direction of the resistance paddle 35.

In the resistance paddle 36 on the lower side, the positional relationship between the small disc part 36a and the large disc part 36b in the conveyance direction is opposite with respect to the small disc part 35a and the large disc part 35b of the resistance paddle 35 on the upper side.

The resistance paddles 35, 36 above and below are disposed so as to face each other with their positions in mutual shaft directions matched. Here, between the large disc parts 35b, 36b above and below and an inner wall 12 of the housing 10, and between the resistance paddles 35, 36 above and below, fine clearances that are capable of compressing the powder A1 are formed.

Between the resistance paddles 35, 36 above and below means between a low end of the small disc part 35a on the upper side and a high end of the large disc part 36b on the lower side, between an end surface on the upstream side of the large disc part 35b on the upper side and an end surface on the downstream side of the large disc part 36b on the lower side, and between a low end of the large disc part 35b on the upper side and an upper end of the small disc part 36a on the lower side. That is, the resistance paddles 35, 36 above and below do not come into mutual contact during rotation of the rotary shafts 21, 22 above and below.

In the housing 10, a powder charging port 13 opened to the outside from the inner wall 12 is formed in a part corresponding to the upstream side of the thickly kneading zone 30. The powder A1 is charged from the powder charging port 13 (see an arrow A1 shown in FIG. 1). When the aqueous electrode paste A5 for negative electrode is produced like the embodiment, in the two-shaft kneader 1, a powder that includes, for example, amorphous coat graphite as an active material and CMC (carboxymethylcellulose) as a thickener is charged from the powder charging port 13.

In the housing 10, on the downstream side of the powder charging port 13, a first solvent charging port 14 opened to the outside from the inner wall 12 is formed. The two-shaft kneader 1 of the embodiment has a structure where from the first solvent charging port 14 and a second solvent charging port 15 described below, the aqueous solvents A2, A3 are charged in two separate charges (see arrow A2, A3 shown in FIG. 1). When the aqueous electrode paste is produced like the embodiment, in the two-shaft kneader 1, for example, ion exchange water is charged from each of the solvent charging ports 14, 15.

Figure 2:
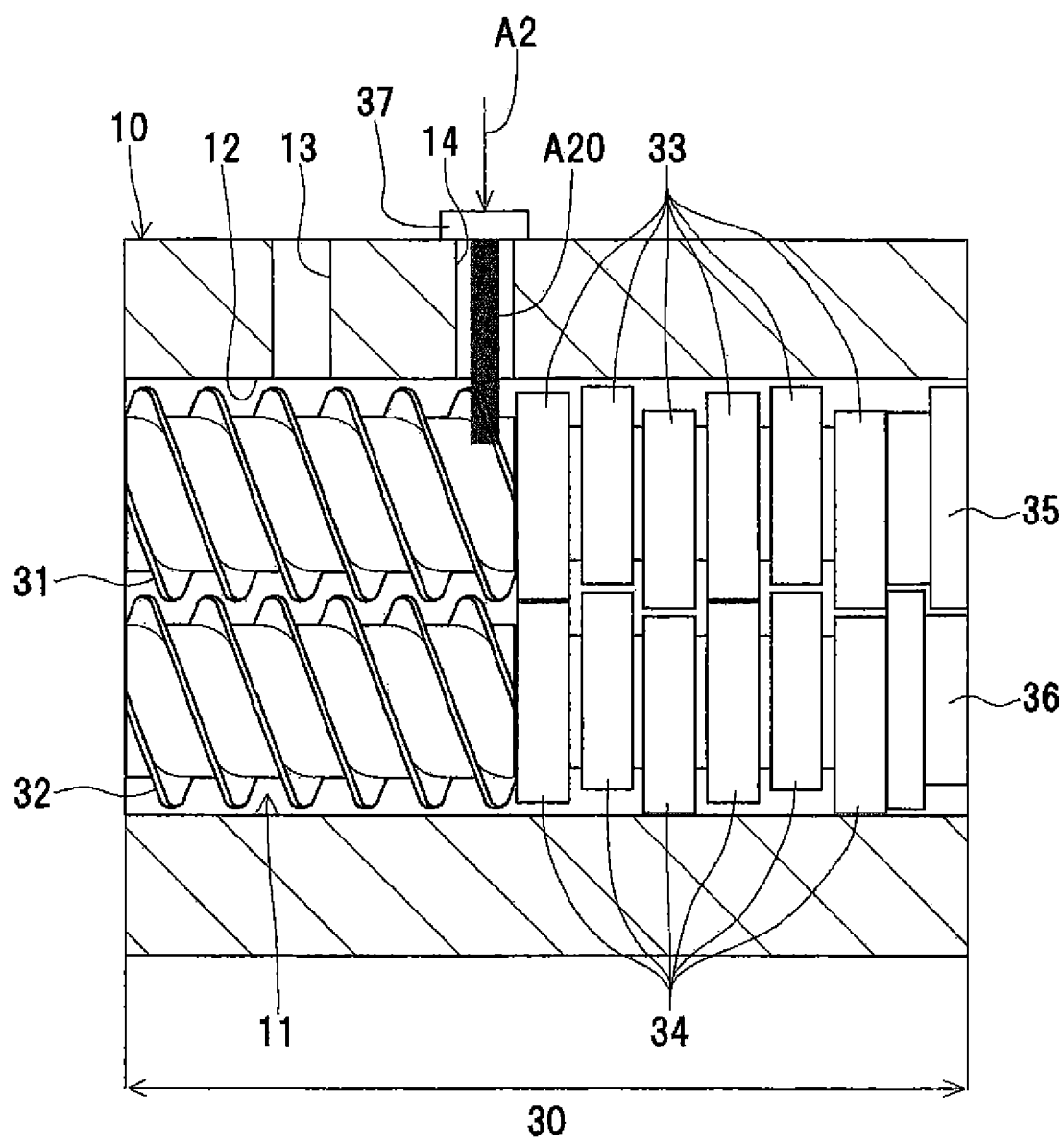
FIG. 2 is an enlarged cross sectional view of a thickly kneading zone of a two-shaft kneader of the embodiment of the invention.

As shown in FIG. 2, the first solvent charging port 14 of the thickly kneading zone 30 is provided with an orifice plate 37. The orifice plate 37 is a substantially plate-like member in which at a center part thereof a hole passing through in an up and down direction is formed.

The aqueous solvent A2 charged from the first solvent charging port 14 is charged inside of the housing 10 via the orifice plate 37. That is, in the thickly kneading zone 30, a rod-like (that is, not in a microparticulated state) aqueous solvent A20 is charged from the first solvent charging port 14.

As shown in FIGS. 1 and 2, in the two-shaft kneader 1, the powder A1 is charged from the powder charging port 13, and the rod-like aqueous solvent A20 is charged from the first solvent charging port 14. That is, in the thickly kneading zone 30, the powder A 1 and the aqueous solvent A2 are charged inside of the housing 10. The two-shaft kneader 1 rotates the conveyance screws 31, 32 above and below about the axes by rotation of rotary shafts 21, 22 above and below. Thus, the charged powder A1 and aqueous solvent A2 are conveyed to the paddles 33, 34 above and below.

Then, the two-shat kneader 1 rotates the paddles 33, 34 above and below about the axes by rotation of the rotary shafts 21, 22 above and below. Thus, between the paddles 33, 34 above and below and the inner wall 12 of the housing 10, a high shearing force is imparted to the conveyed powder A1 and aqueous solvent A2. Further, the two-shaft kneader 1 rotates the resistance paddles 35, 36 above and below about the axes by rotation of the rotary shafts 21, 22 above and below. Thus, between the large disc parts 35b, 36b above and below and the inner wall 12 of the housing 10, and between the resistance paddles 35, 36 above and below, the powder A1 is compressed.

Thus, the two-shaft kneader 1 thickly kneads the powder A1 and the aqueous solvent A2 in the thickly kneading zone 30 to generate a mixture including the powder A1 and the aqueous solvent A2. The mixture like this has a solid content ratio (weight % of the powder A1 with respect to an entire weight of the powder A1 and the aqueous solvent A2) higher than that of the aqueous electrode paste A5.

Thus, according to the method for producing the aqueous electrode paste, a step of thickly kneading where, using the two-shaft kneader 1, the powder A1 and the aqueous solvent A2 are thickly kneaded to generate a mixture is performed. Further, the thickly kneading zone 30 thickly kneads the powder A1 and the aqueous solvent A2 by rotating the rotary shafts 21, 22 above and below.

As shown in FIG. 1, the diluting zone 40 is a part where the mixture generated in the thickly kneading zone 30 is diluted with the aqueous solvent A3. The diluting zone 40 is disposed in a position abutting on the thickly kneading zone 30 on the downstream side of the thickly kneading zone 30, The diluting zone 40 is provided with the conveyance screw 41, six paddles 43, and the resistance paddle 45 supported by the rotary shaft 21 on the upper side, and the conveyance screw 42, six paddles 44, and the resistance paddle 46 supported by the rotary shaft 22 on the lower side.

The conveyance screws 41, 42 above and below are formed in the same manner as the conveyance screws 31, 32 in the thickly kneading zone 30 except that the conveyance screws 41, 42 are disposed at an end on the upstream side of the diluting zone 40 and have shorter lengths along the conveyance direction.

The paddles 43, 44 above and below are formed in the same manner as the paddles 33, 34 in the thickly kneading zone 30 except that the paddles 43, 44 above and below are disposed between the upstream side and the downstream side of the diluting zone 40.

The resistance paddles 45, 46 above and below are formed in the same manner as the resistance paddles 35, 36 in the thickly kneading zone 30 except that the resistance paddles 45, 46 above and below are disposed at an end on the downstream side of the diluting zone 40. That is, in the resistance paddles 45, 46 above and below, small disc parts 45a, 46a and large disc parts 45b, 46b having the same shape as the small disc parts 35a, 36a and the large disc part 35b, 36b of the resistance paddles 35, 36 are formed.

In the housing 10, in a part corresponding to the upstream side of the diluting zone 40, the second solvent charging port 15 opened to the outside from the inner wall 12 is formed. The remaining aqueous solvent A3 (aqueous solvent other than the aqueous solvent A2 supplied from the first solvent charging port 14) necessary for producing the aqueous electrode paste A5 is charged from the second solvent charging port 15 (see arrow A3 shown in FIG. 1).

Figure 3:
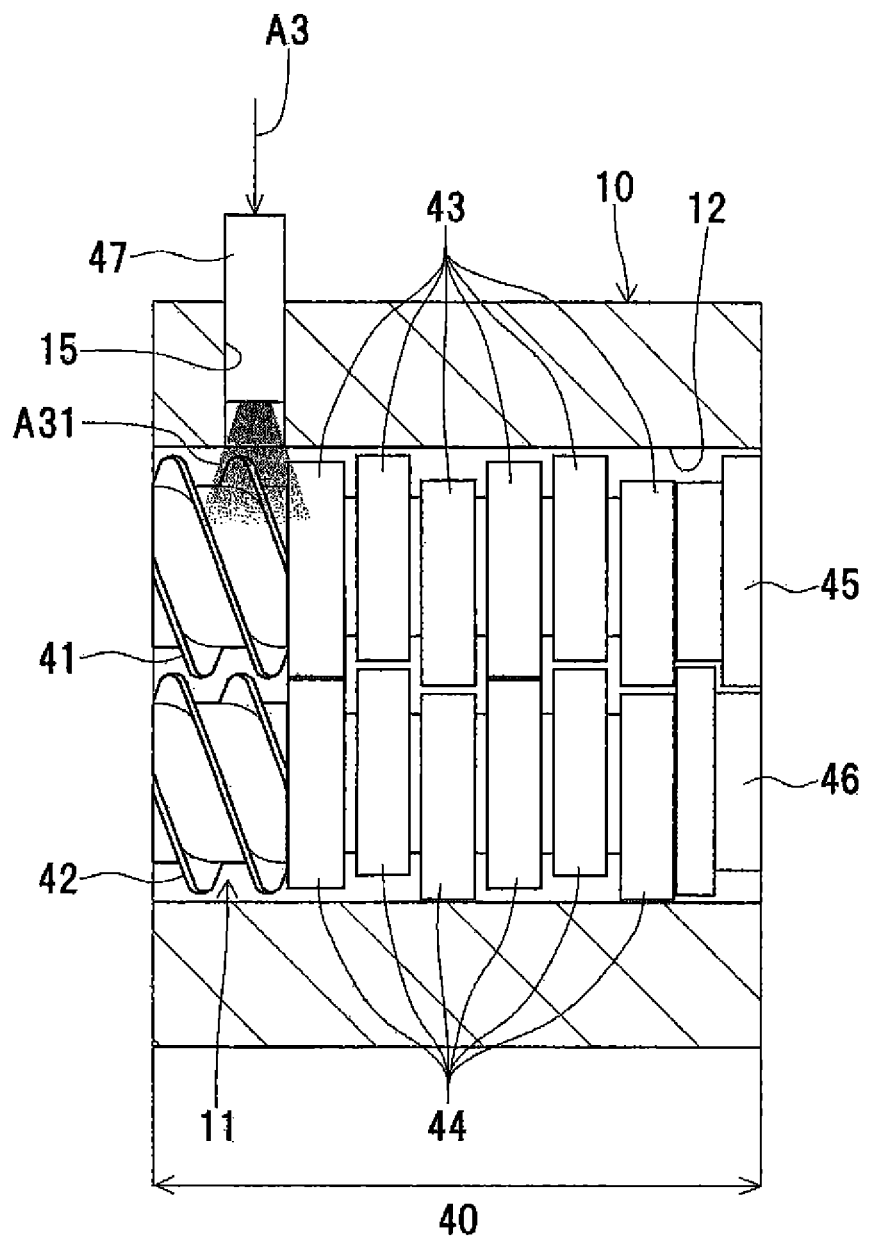
FIG. 3 is an enlarged cross sectional view of a diluting zone of a two-shaft kneader of the embodiment of the invention.

As shown in FIG. 3, an air assisted atomizer nozzle 47 is provided in the second solvent charging port 15 of the diluting zone 40. The air assisted atomizer nozzle 47 renders a liquid in a misty state (a microparticulated state such that an average liquid droplet diameter is in a magnitude in a predetermined range) using pressurized air and is ejected from the discharging port. The discharging port of the air assisted atomizer nozzle 47 is directed toward the inside of the housing 10.

As shown in FIGS. 1 and 3, the two-shaft kneader 1 sprays a misty aqueous solvent A31 from the air assisted atomizer nozzle 47. Thus, in the diluting zone 40, the aqueous solvent A3 is charged inside of the housing 10. The two-shaft kneader 1 rotates the conveyance screws 41, 42 above and below about the axes by rotation of the rotary shafts 21, 22 above and below. Thus, the mixture and the aqueous solvent A3 are conveyed to the paddles 43, 44 above and below.

Then, the two-shaft kneader 1 rotates the paddles 43, 44 above and below about the axes by the rotation of the rotary shafts 21, 22 above and below. Thus, in the same manner as the paddles 33, 34 above and below in the thickly kneading zone 30, a high shearing force is imparted to the mixture and the aqueous solvent A3. Accordingly, the two-shaft kneader 1 rotates the resistance paddles 45, 46 above and below about the axes by the rotation of the rotary shafts 21, 22 below and above.

Thus, the two-shaft kneader 1 dilutes the mixture with the aqueous solvent A3 charged from the second solvent charging port 15 in the diluting zone 40 to generate a slurry in which particles of the negative electrode active material are dispersed in a medium including the aqueous solvents A2, A3 and the thickener. Thus, in the same manner as the resistance paddles 35, 36 above and below in the thickly kneading zone 30, the powder A1 is compressed.

Thus, according to the method for producing an aqueous electrode paste, a step of diluting where the aqueous solvent A3 is charged in the two-shaft kneader 1, using the two-shaft kneader 1, the mixture is diluted with the charged aqueous solvent A3 is performed. Further, in the diluting zone 40, by rotating the rotary shafts 21, 22 above and below, the mixture is diluted with the charged aqueous solvent A3.

As shown in FIG. 1, the binder mixing zone 50 is a part where the slurry and the binder A4 are mixed. The binder mixing zone 50 is disposed in a position abutting on the diluting zone 40 on the downstream side of the diluting zone 40. The binder mixing zone 50 is provided with a conveyance screw 51 and two paddles 53 supported by the rotary shaft 21 on the upper side, and a conveyance screw 52 and two paddles 54 supported by the rotary shaft 22 on the lower side.

The conveyance screws 51, 52 above and below are formed in the same manner as the conveyance screws 41, 42 of the diluting zone 40 except that the conveyance screws 51, 52 are disposed at end on the upstream side of the binder mixing zone 50.

The paddles 53, 54 above and below are formed in the same manner as the paddles 43, 44 of the diluting zone 40 except that the paddles 53, 54 are disposed between an intermediate part and an end on the downstream side in the conveyance direction of the binder mixing zone 50.

In the housing 10, in a part corresponding to an end on the upstream side of the binder mixing zone 50, the binder charging port 16 opened to the outside from the inner wall 12 is formed. The binder A4 is charged from the binder charging port 16 (see arrow A4 shown in FIG. 1).

In the housing 10, in a part corresponding to an end on the downstream side of the binder mixing zone 50, an discharge port 17 opened to the outside from the inner wall 12 is formed.

In the two-shaft kneader 1, the binder A4 is charged form the binder charging port 16. The two-shaft kneader 1 rotates the screws 51, 52 above and below about the axes by the rotation of the rotary shafts 21, 22 above and below. Thus, the slurry and the binder A4 are conveyed to the paddles 53, 54 above and below.

Then, in the binder mixing zone 50, the paddles 53, 54 above and below are rotated about the axes by rotation of the rotary shafts 21, 22 above and below. Thus, in the same manner as the paddles 33, 34 above and below of the thickly kneading zone 30, a high shearing force is imparted to the slurry and the binder A4 to add the binder A4 to the slurry.

Thus, the two-shaft kneader 1 produces the aqueous electrode paste A5. Thereafter, in the binder mixing zone 50, the produced aqueous electrode paste A5 is discharged outside of the housing 10 from the discharge port 17 (see arrow A5 shown in FIG. 1).

The return zone 60 is a part where the aqueous electrode paste A5 is returned to the discharge port 17. The return zone 60 is formed at an end on the downstream side of the kneading chamber 11 and disposed in a position abutting on the binder mixing zone 50 on the downstream side of the binder mixing zone 50. The return zone 60 is provided with a return screw 61 supported by the rotary shaft 21 on the upper side and a return screw 62 supported by the rotary shaft 22 on the lower side.

The return screws 61, 62 above and below are formed in the same manner as the conveyance screws 51, 52 of the binder mixing zone 50 except that the return screws 61, 62 above and below are disposed in the return zone 60 and the direction of a spiral blade is opposite.

In the return zone 60, the return screws 61, 62 above and below are rotated about the axes by the rotation of the rotary shafts 21, 22 above and below. Thus, the aqueous electrode paste A5 is pushed back in a direction opposite (upstream side) to the conveyance direction thereof, and the aqueous electrode paste A5 is discharged from the discharge port 17 outside of the housing 10.

Here, the thickener except a part thereof absorbs the aqueous solvent A2 charged in the thickly kneading zone 30, swells, and is pulverized by the paddles 33, 34 of the thickly kneading zone 30. That is, insoluble cellulose contained in a part of thickener is neither swollen nor pulverized in the thickly kneading zone 30 (for example, compared with cellulose contained in the other part of the thickener that has been swollen and pulverized, only half is swollen and pulverized) and conveyed to the diluting zone 40.

Then, cellulose contained in a part of the thickener absorbs the aqueous solvent A3 charged in the diluting zone 40, swells, is pulverized by the paddles 43, 44 above and below, and is dispersed in a medium including the aqueous solvents A2, A3 and the thickener.

When the cellulose contained in a part of the thickener like this absorbs a rod-like aqueous solvent (see FIG. 2), the cellulose rapidly swells. As a result, microgels having a large size are formed. In this case, in the two-shaft kneader 1, the paddles 43, 44 above and below provided to the diluting zone 40 can not pulverize the microgels. As a result, in the aqueous electrode paste, microgels having a large size remain.

Here, as shown in FIG. 3, the two-shaft kneader 1 sprays a misty aqueous solvent A31 as the aqueous solvent A3 for diluting the mixture inside of the housing 10. That is, the two-shaft kneader 1 sprays the misty aqueous solvent A31 to the cellulose contained in a part of thickener that has been neither swollen nor pulverized and allows the cellulose to absorb the misty aqueous solvent A31.

According to this, the two-shaft kneader 1 can slowly swell the cellulose contained in a part of thickener. That is, the two-shaft kneader 1 can pulverize the slowly swelling cellulose by the paddles 43, 44 above and below disposed in the diluting zone 40.

Here, the cellulose contained in a part of the thickener (cellulose that swells in the diluting zone 40) rapidly swells when absorbing the misty aqueous solvent having an average liquid droplet diameter larger than an average particle diameter (D50) of the thickener.

In this connection, the two-shaft kneader 1 sprays the misty aqueous solvent A31 of which average liquid droplet diameter is an average particle diameter (D50) of the thickener or less. Specifically, when an average particle diameter (D50) of the thickener is 100 μm, the two-shaft kneader 1 sprays the misty aqueous solvent A31 of which average liquid droplet diameter is 100 μm or less. Thus, the two-shaft kneader 1 can surely hinder the cellulose contained in part of thickener from rapidly swelling in the diluting zone.

Further, the two-shaft kneader 1 sprays, in the diluting zone 40, the misty aqueous solvent A31 of which average liquid droplet diameter is 1 μm or more. This is because when the average liquid droplet diameter is smaller than 1 μm, discharge pressure is too high when a liquid is sprayed from the air assisted atomizer nozzle 47, and stable supply of the liquid to the diluting zone 40 becomes difficult. According to this, the two-shaft kneader 1 can spray the misty aqueous solvent A31 under proper discharge pressure (not too high discharge pressure). That is, the two-shaft kneader 1 can stably spray the misty aqueous solvent A31.

As described above, in the method for producing an aqueous electrode paste, in the step of diluting, the aqueous solvent A3 for diluting the mixture is sprayed in the two-shaft kneader 1 in a misty state where an average liquid droplet diameter is 1 μm or more and an average particle diameter (D50) of the thickener or less. Further, in the two-shaft kneader 1, in the diluting zone 40, the air assisted atomizer nozzle 47 (first spray) that sprays the aqueous solvent A3 for diluting the mixture in a misty state where an average liquid droplet diameter is 1 μm or more and an average particle diameter (D50) of the thickener or less inside of the housing 10 is disposed.

According to this, the method for producing the aqueous electrode paste and the two-shaft kneader 1 can reduce the size of the microgels in the aqueous electrode paste A5.

Therefore, the method for producing an aqueous electrode paste and the two-shaft kneader 1 can hinder the size of the micro gels from becoming larger than a thickness of a coated film formed by coating the aqueous electrode paste A5 on a negative electrode current collector and by drying. Thus, the method for producing an aqueous electrode paste and the two-shaft kneader 1 can hinder the coating defects such as lack of hiding and pinholes from occurring in the coated film. That is, the method for producing an aqueous electrode paste and the two-shaft kneader 1 can reduce the number of occurrence of the coating defects. Therefore, when the aqueous electrode paste AS is produced according to the method for producing an aqueous electrode paste and the two-shaft kneader 1, a yield of batteries can be improved.

Further, the method for producing an aqueous electrode paste and the two-shaft kneader 1 can reduce the maximum size of the microgels remaining in the aqueous electrode paste A5. Therefore, when the aqueous electrode paste AS is produced according to the method for producing an aqueous electrode paste and the two-shaft kneader 1, an increase in the battery resistance caused by lithium precipitation can be hindered.

Further, the method for producing an aqueous electrode paste and the two-shaft kneader 1 do not require scraping of the aqueous electrode paste attached to a stirring blade of a planetary mixer with a paddle during kneading. Therefore, the method for producing an aqueous electrode paste and the two-shaft kneader 1 can reduce the working hours and direct labor cost.

Here, the capacity retention rate of a battery is improved by making a particle size of the negative electrode active material larger. When a particle size of the negative electrode active material is made larger, an absorption amount (hereinafter, referred to as "oil absorption") of oil (linseed oil) absorbed by the negative electrode active material becomes less. When the oil absorption is less, it is necessary to increase the solid content ratio in the thickly kneading zone 30 (to reduce an amount of moisture).

In this case, many thickeners are neither swollen nor pulverized in the kneading zone 30 and conveyed to the diluting zone 40. That is, cellulose contained in many thickeners absorbs the aqueous solvent A3 in the diluting zone 40 and swells.

That is, when a particle size of the negative electrode active material is made larger to improve the capacity retention rate of a battery, cellulose that may rapidly swell increases. Therefore, in this case, the microgels having a large size tend to remain in the aqueous electrode paste A5.

Also in the case like this, the two-shaft kneader 1 can slowly swell much cellulose that is neither swollen nor pulverized by spraying the misty aqueous solvent A31 in the diluting zone 40. Therefore, the method for producing an aqueous electrode paste and the two-shaft kneader 1 can hinder the size of microgels from becoming large even when the particle size of the active material is made larger to improve the capacity retention rate of a battery.

That is, when the electrode paste A5 is produced by the method for producing an aqueous electrode paste and the two-shaft kneader 1, the number of occurrence of the coating defects can be reduced, and, while reducing the maximum size of the coating defects, the capacity retention rate of a battery can be improved.

Next, results of evaluation of the coating defects of the coated film will be described.

In the evaluation of the coating defects, as the negative electrode active material, the thickener, the aqueous solvent, and the binder, using amorphous coat graphite, CMC, ion exchanged water, and SBR (styrene butadiene rubber) respectively, the aqueous electrode paste for negative electrode was produced.

In the evaluation of the coating defects, the aqueous electrode paste where a ratio of the negative electrode active material, thickener and the binder (solid content composition ratio of the aqueous electrode paste) is 98.6:0.7:0.7 and the solid content ratio is 54% was produced.

In the evaluation of the coating defects, as the aqueous electrode paste for negative electrode satisfying the predetermined solid content composition ratio and the solid content ratio, aqueous electrode pastes of first example, second example, and first to fifth comparative examples such as described below were produced. In each of the aqueous electrode pastes, a charging condition of the aqueous solvent A2, A3 is different mainly.

Figure 4:
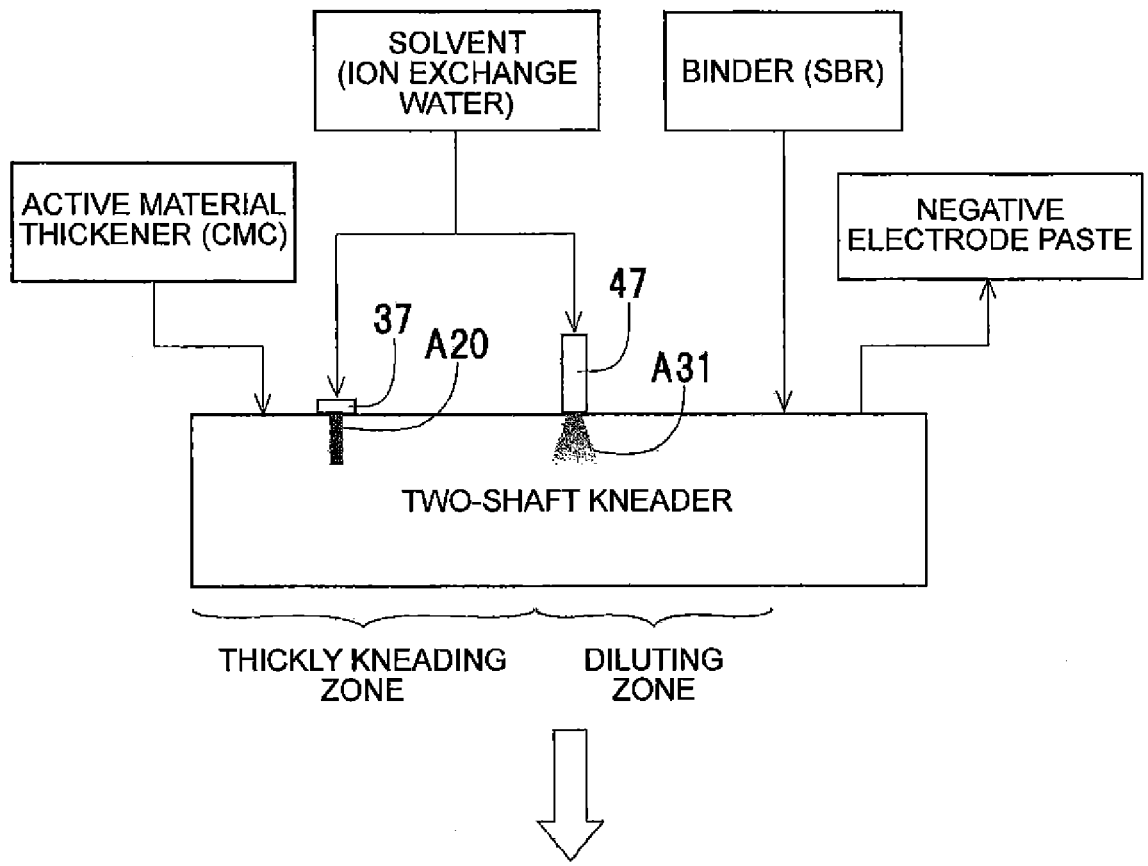
FIG. 4 is a diagram showing charging conditions of an aqueous solvent when an aqueous electrode paste of a first example of the invention is produced and the largest coating defect generated in a coated film.
Figure 4:
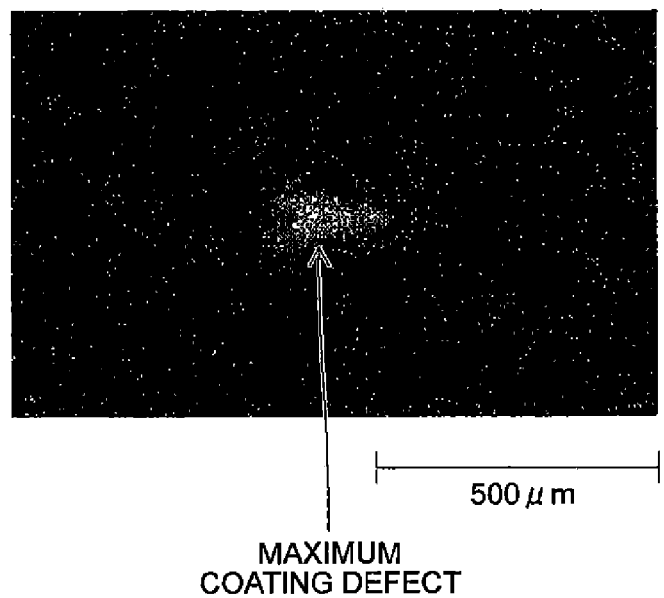

The aqueous electrode paste of the first example is an aqueous electrode paste produced using the two-shaft kneader 1 such as described in the embodiment. That is, as shown in FIG. 4, the aqueous electrode paste of the first example is an aqueous electrode paste produced by charging the rod-like aqueous solvent A20 in the thickly kneading zone 30 and by spraying the misty aqueous solvent A31 in the diluting zone 40. An average liquid droplet diameter of the misty aqueous solvent A31 is set to 1 μm or more and an average particle diameter (D50) of the thickener (CMC) or less.

Figure 5:
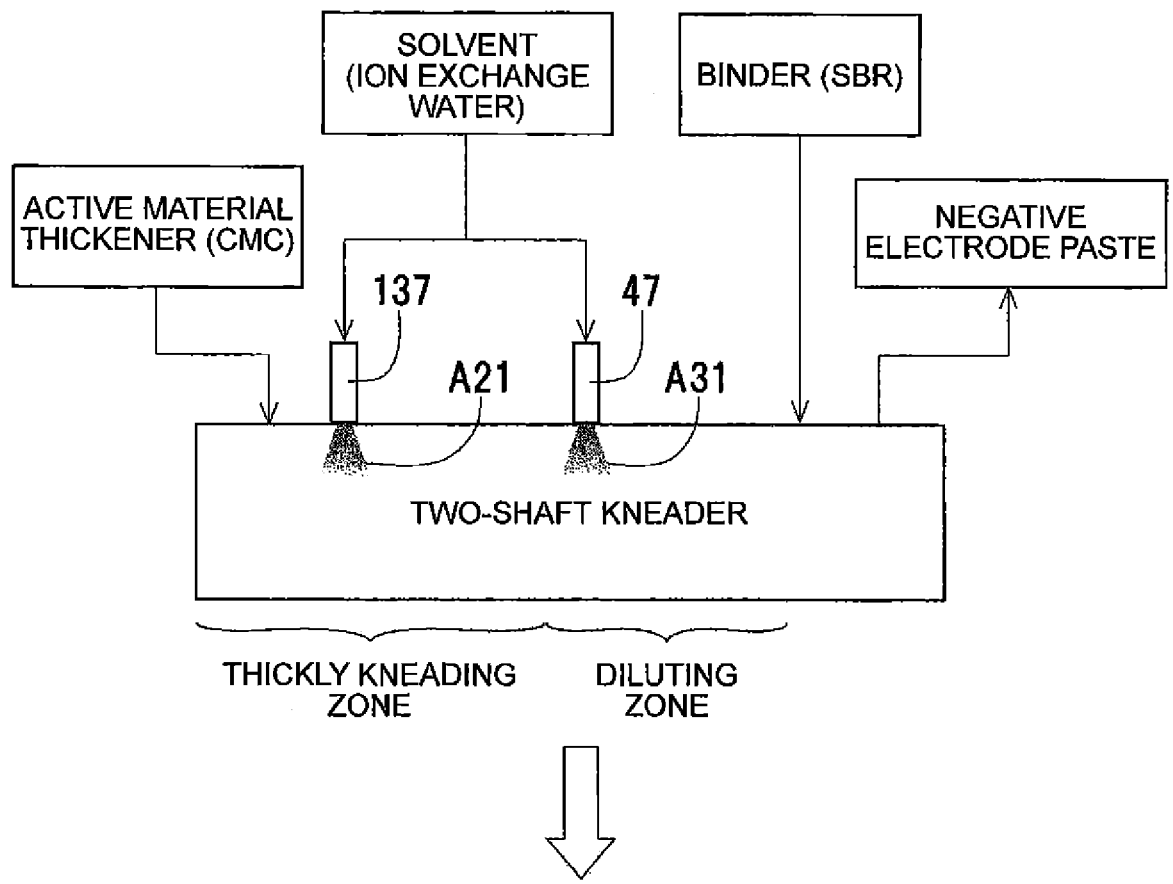
FIG. 5 is a diagram showing charging conditions of an aqueous solvent when an aqueous electrode paste of a second example of the invention is produced and the largest coating defect generated in a coated film.
Figure 5:
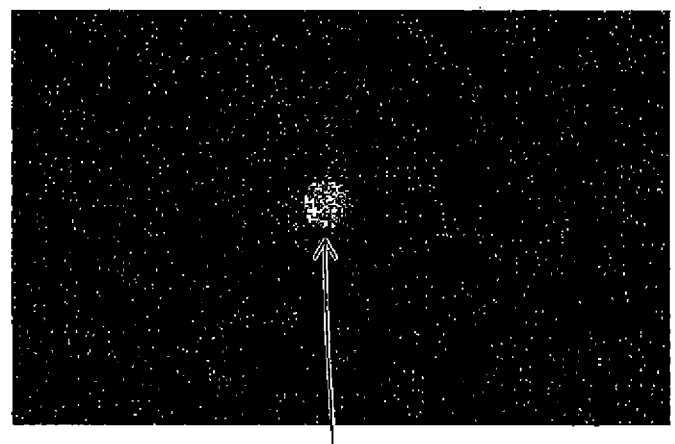

As shown in FIG. 5, an aqueous electrode paste of the second example is an aqueous electrode paste produced using a two-shaft kneader structured in the same manner as the two-shaft kneader 1 according to the embodiment except that an air assisted atomizer nozzle 137 is provided in the first solvent charging port 14. That is, the aqueous electrode paste of the second example is an aqueous electrode paste produced by spraying the misty aqueous solvents A21, A31 in the thickly kneading zone 30 and the diluting zone 40. Each of average liquid droplet diameters of the misty aqueous solvents A21, A31 is set to 1 μm or more and an average particle diameter (D50) of the thickener (CMC) or less.

Figure 6:
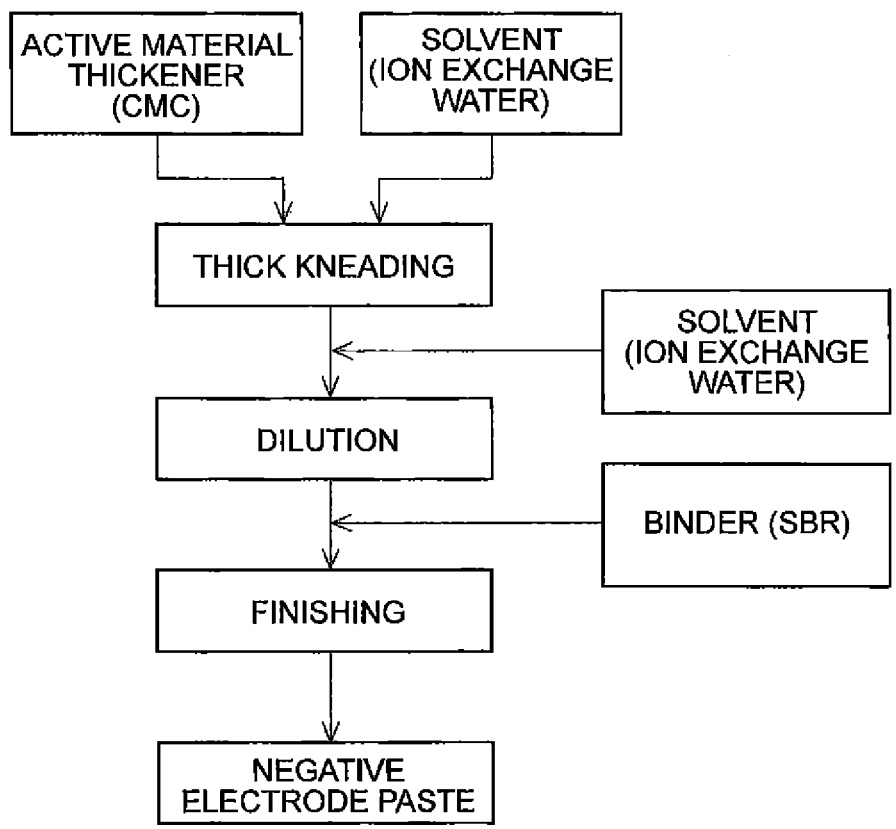
FIG. 6 is a diagram showing charging conditions of an aqueous solvent when an aqueous electrode paste of a first comparative example is produced and the largest coating defect generated in a coated film.
Figure 6:
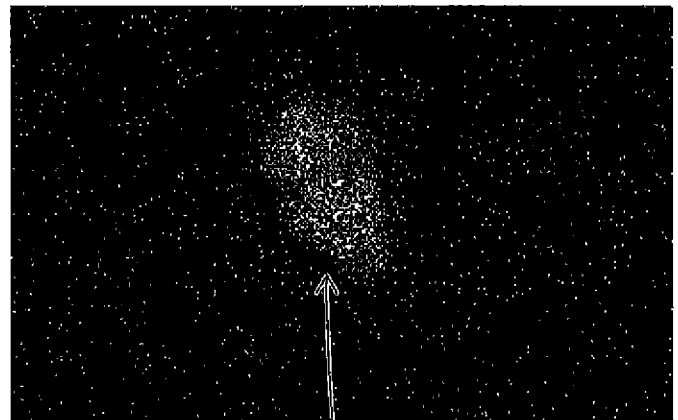

As shown in FIG. 6, an aqueous electrode paste of the first comparative example is produced as shown below. A powder and an aqueous solvent are charged in a tank of a commercially available planetary mixer. After the powder and aqueous solvent are thickly kneaded by the planetary mixer, an aqueous solvent is charged to dilute. Thereafter, a binder is charged in a tank to perform finishing kneading. In the production of the aqueous electrode paste of the first comparative example, the aqueous solvent is charged in the tank of the planetary mixer en bloc during thickly kneading and diluting.

Figure 7:
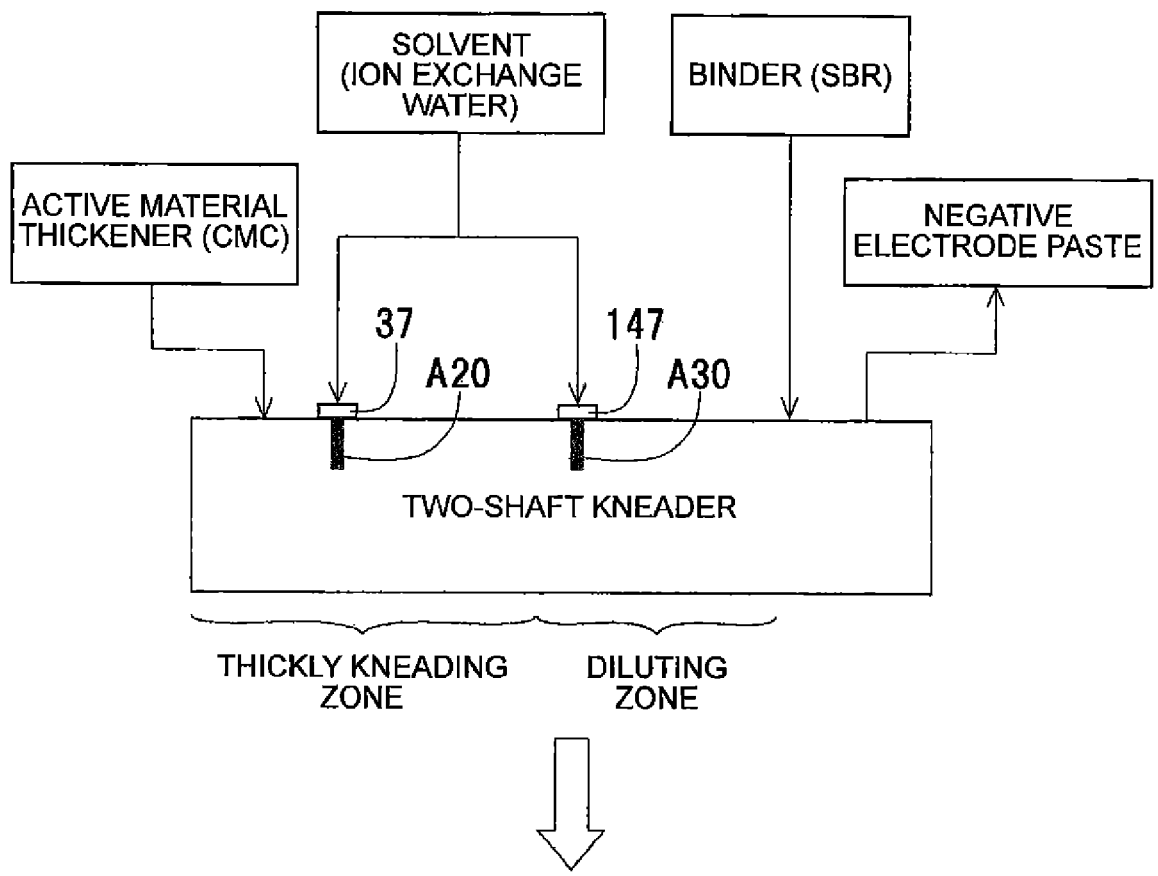
FIG. 7 is a diagram showing charging conditions of an aqueous solvent when an aqueous electrode paste of a second comparative example is produced and the largest coating defect generated in a coated film.
Figure 7:
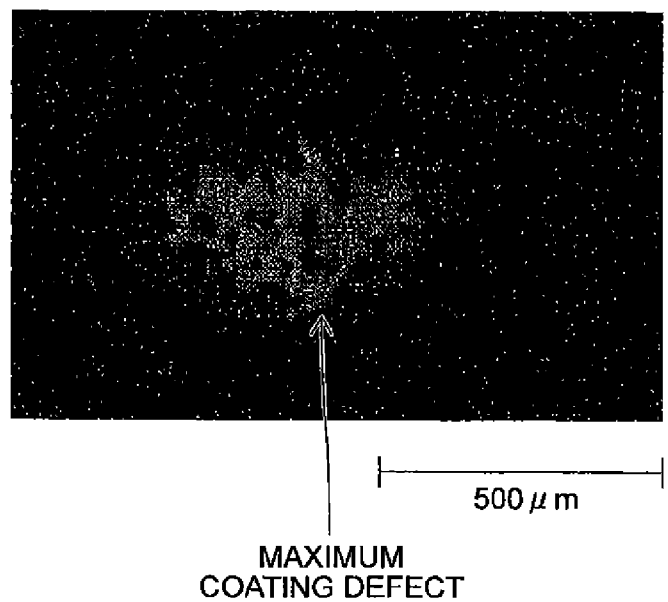

As shown in FIG. 7, an aqueous electrode paste of the second comparative example is an aqueous electrode paste produced using a two-shaft kneader structured in the same manner as the two-shaft kneader 1 according to the embodiment except that an orifice plate 147 is provided in the second solvent charging port 15. That is, the aqueous electrode paste of the second comparative example is an aqueous electrode paste produced by charging the rod-like aqueous solvents A20, A30 in the thickly kneading zone 30 and diluting zone 40. In other words, the aqueous electrode paste of the second comparative example corresponds to an aqueous electrode paste produced using a common continuous two-shaft kneader.

Figure 8:
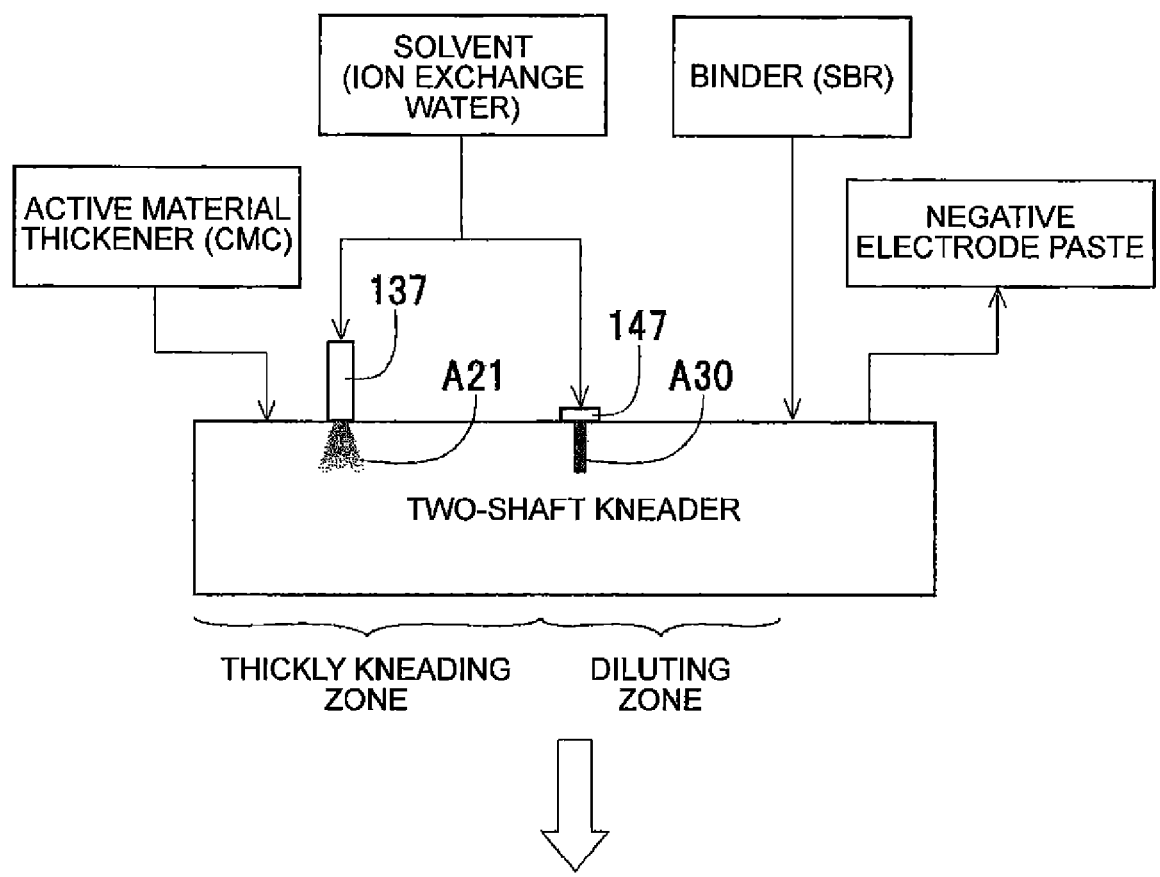
FIG. 8 is a diagram showing charging conditions of an aqueous solvent when an aqueous electrode paste of a third comparative example is produced and the largest coating defect generated in a coated film.
Figure 8:
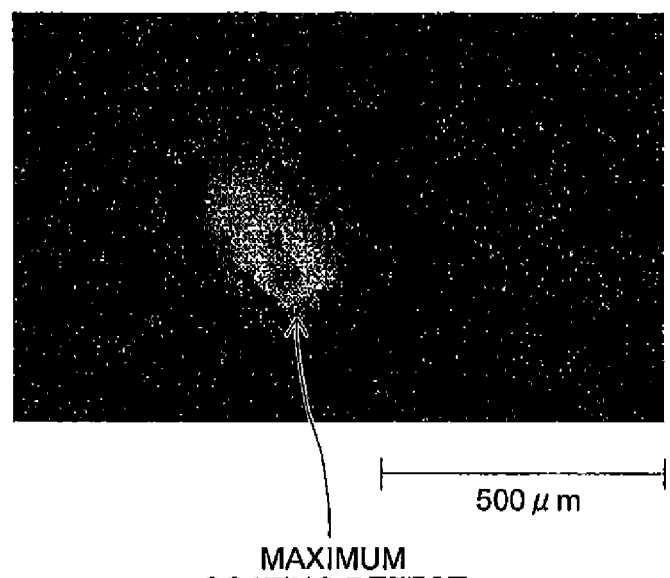

As shown in FIG. 8, an aqueous electrode paste of the third comparative example is an aqueous electrode paste produced using a two-shaft kneader structured in the same manner as the two-shaft kneader 1 according to the embodiment except that the air assisted atomizer nozzle 137 is provided in the first solvent charging port 14 and the orifice plate 147 is provided in the second solvent charging port 15. That is, the aqueous electrode paste of the third comparative example is an aqueous electrode paste produced by spraying the misty aqueous solvent A21 in the thickly kneading zone 30 and by charging the rod-like aqueous solvent A30 in the diluting zone 40. An average liquid droplet diameter of the misty aqueous solvent A21 is set to 1 μm or more and an average particle diameter (D50) of the thickener (CMC) or less.

Figure 9:
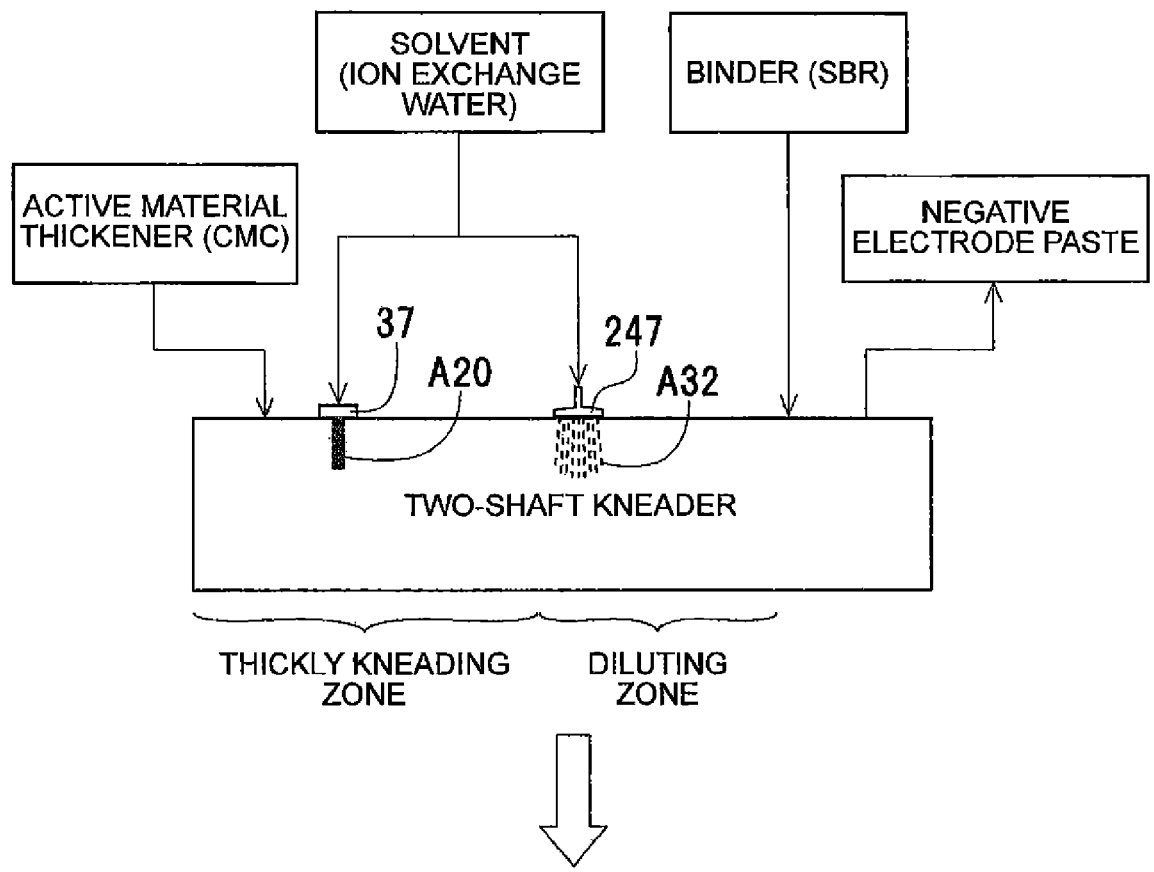
FIG. 9 is a diagram showing charging conditions of an aqueous solvent when an aqueous electrode paste of a fourth comparative example is produced and the largest coating defects generated in a coated film.
Figure 9:
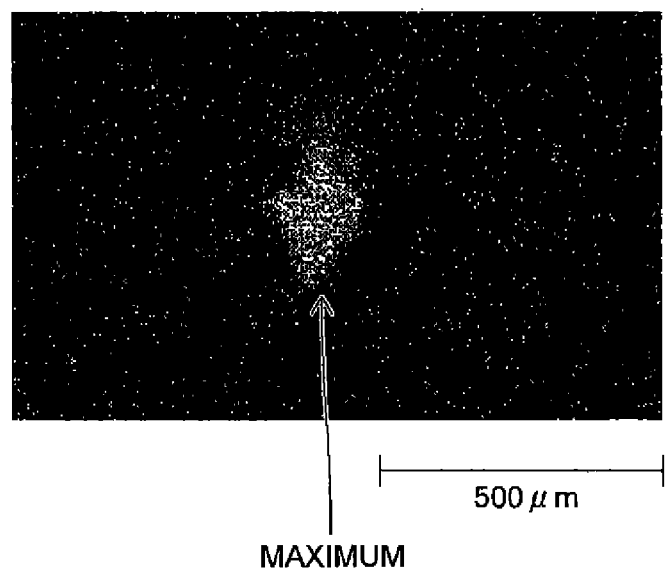

As shown in FIG. 9, an aqueous electrode paste of the fourth comparative example is an aqueous electrode paste produced using a two-shaft kneader structured in the same manner as the two-shaft kneader 1 according to the embodiment except that a shower nozzle 247 is provided in the second solvent charging port 15. That is, the aqueous electrode paste of the fourth comparative example is an aqueous electrode paste produced by charging the rod-like aqueous solvent A20 in the thickly kneading zone 30 and by charging a shower-like aqueous solvent A32 in the diluting zone 40.

Figure 10:
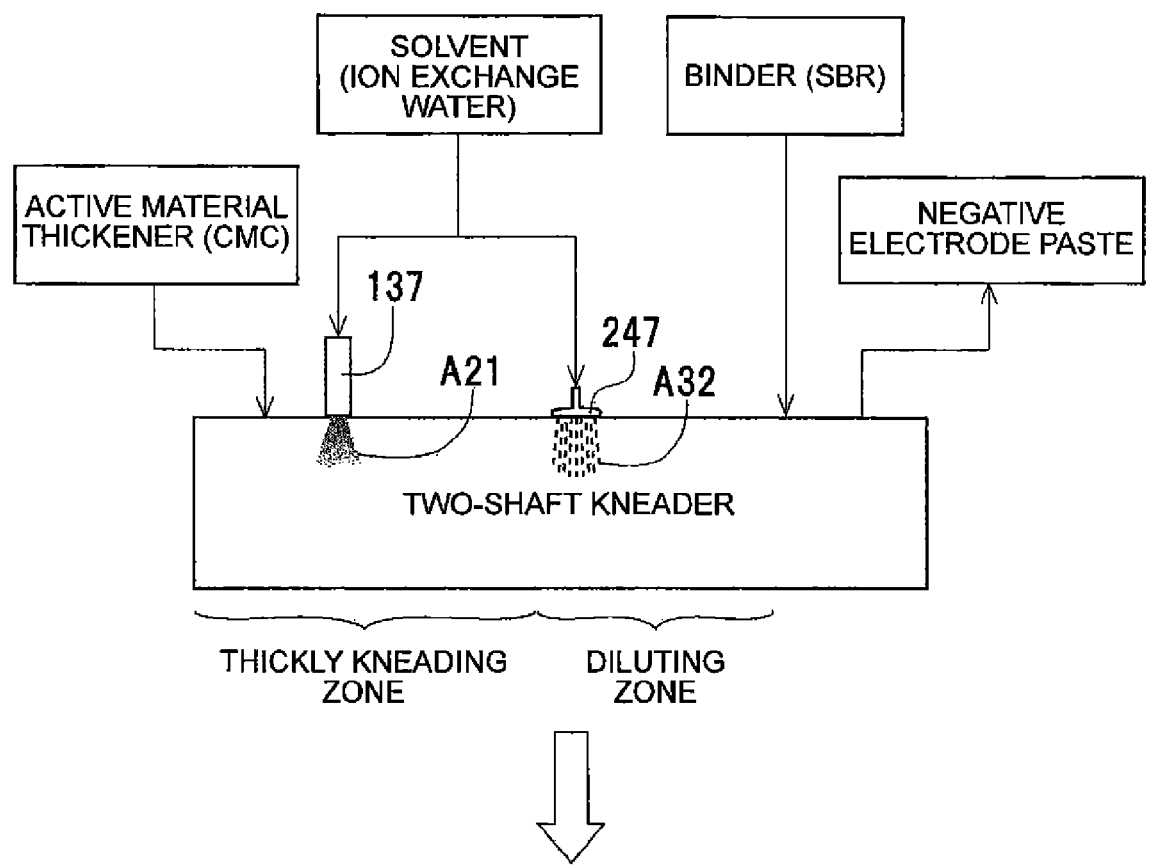
FIG. 10 is a diagram showing charging conditions of an aqueous solvent when an aqueous electrode paste of a fifth comparative example is produced and the largest coating defects generated in a coated film.
Figure 10:
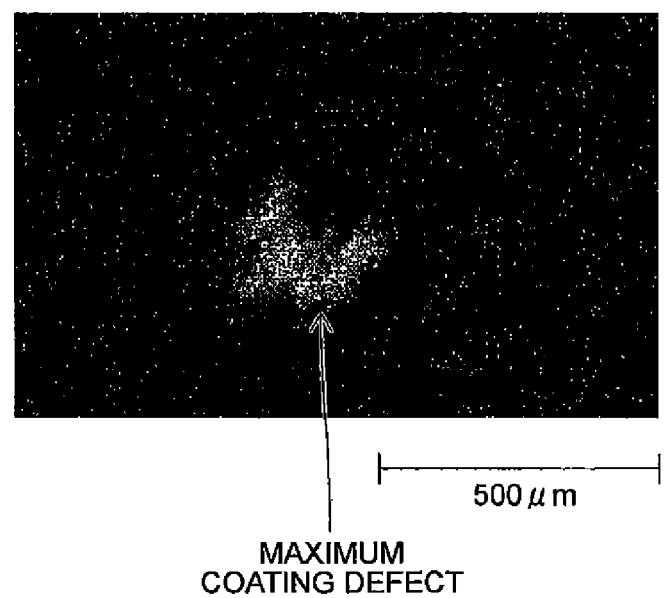

As shown in FIG. 10, an aqueous electrode paste of the fifth comparative example is an aqueous electrode paste produced using a two-shaft kneader structured in the same manner as the two-shaft kneader 1 according to the embodiment except that the air assisted atomizer nozzle 137 is provided in the first solvent charging port 14 and the shower nozzle 247 is provided in the second solvent charging port 15. That is, the aqueous electrode paste according to the fifth comparative example is an aqueous electrode paste produced by spraying the misty aqueous solvent A21 in the thickly kneading zone 30 and by charging the shower-like aqueous solvent A32 in the diluting zone 40. An average liquid droplet diameter of the misty aqueous solvent A21 is set to 1 μm or more, and an average particle diameter (D50) of the thickener (CMC) or less.

By setting the number of rotations of the rotary shafts 21, 22 above and below of each of two-shaft kneaders for producing the aqueous electrode pastes of the first example, second example, and the second to fifth comparative examples to 600 rpm, each of aqueous electrode pastes was produced. Further, in each of the two-shaft kneaders and the planetary mixer for producing the aqueous electrode paste of the first comparative example, the solid content ratio in the thickly kneading zone 30 (mixture) was set to 66%, and each of the aqueous electrode pastes was produced.

The coating defects were evaluated as described below. Each of the aqueous electrode pastes was coated on each of the negative electrode current collectors, dried, and coated films were formed. The coated films were inspected with a defect inspector. The number of occurrences of the coating defects (number of coating defects) such as the lack of hiding and pin holes was measured. In the evaluation of the coating defects, by considering yield of batteries in subsequent steps, the case where the number of defects is 2 defects/m or less is determined acceptable, and the case where the number of defects is 3 defects/m or more was determined as NG.

In the evaluation of the coating defects, the coating defects were observed with a microscope, and the size (maximum defect size) of the largest coating defect among the coating defects was calculated. In the evaluation of the coating defects, when the coating defects are observed from a thickness direction of the coated film, a distance of a straight line that is orthogonal to a straight line that is longest from one end to the other end of the coating defect was taken as the maximum defect size. In the evaluation of the coating defects, by considering lithium precipitation, the case where the maximum defect size is less than 100 μm was determined as OK, and the case where the maximum defect size is 100 μm or more was determined as NG.

A determination column shown in FIG. 11 shows results of determinations of the number of the coating defects and the maximum defect size. Specifically, when both of the number of coating defects and the maximum defect size are determined as OK, "O" is indicated, and when at least any one of the number of coating defects and the maximum defect size was determined as NG, "X" is indicated.

As shown in FIGS. 6 and 11, the aqueous electrode paste of the first comparative example had the number of coating defects of 67 defects/m and the maximum defect size of 230 μm. Further, as shown in FIGS. 7 and 11, the aqueous electrode paste of the second comparative example had the number of coating defects of 89 defects/m and the maximum defect size of 260 μm. That is, when the powder and the aqueous solvent were charged en bloc, and when the rod-like aqueous solvents A20, A30 were charged in the thickly kneading zone 30 and the diluting zone 40, the coating defects occurred much and the maximum defect size was large.

That is, in the aqueous electrode pastes of the first and second comparative examples, both of the number of coating defects and the maximum defect size were determined as NG As shown in FIGS. 8 and 11, the aqueous electrode paste of the third comparative example had the number of coating defects of 75 defects/m and the maximum defect size of 140 µm. That is, even when the rod-like aqueous solvent A30 is charged in the diluting zone 40, by spraying the misty aqueous solvent A21 in the thickly kneading zone 30, the maximum defect size could be reduced to about 60%. However, the number of coating defects could not be reduced.

That is, the aqueous electrode paste of the third comparative example was determined as NG in both of the number of coating defects and the maximum defect size.

As shown in FIGS. 9 and 11, in the aqueous electrode paste of the fourth comparative example, the number of coating defects was 32 defects/m and the maximum defect size was 160 µm. Further, as shown in FIGS. 10 and 11, the aqueous electrode paste of the fifth comparative example had the number of coating defects of 30 defects/m and the maximum defect size of 190 µm. That is, when the shower-like aqueous solvent A32 was charged in the diluting zone 40, compared with the aqueous electrode pastes of the first comparative example and the second comparative example, the number of the coating defects could be reduced to about half, and the maximum defect size could be reduced to about 70%.

However, in the aqueous electrode pastes of the fourth and fifth comparative examples, both of the number of coating defects and the maximum defect size were determined as NG. That is, in the aqueous electrode pastes of the fourth and fifth comparative examples, it was confirmed that, by charging the shower-like aqueous solvent A32 in the diluting zone 40, the size of the microgels in the aqueous electrode paste can be reduced. However, quality of the aqueous electrode paste could not be sufficiently secured.

On the other hand, as shown in FIGS. 4 and 11, according to the aqueous electrode paste of the first example, the number of coating defects was 1 defect/m, and the maximum defect size was 80 µm. Further, as shown in FIGS. 5 and 11, according to the aqueous electrode paste of the second example, the number of coating defects was 1 defect/m and the maximum defect size was 70 µm.

That is, the aqueous electrode pastes of the first and second examples were determined as OK in both of the number of coating defects and the maximum defect size.

As obvious also from the above results, it is found that, when the aqueous electrode paste was produced by spraying the misty aqueous solvent A31 in the diluting zone 40, the number of coating defects could be largely reduced, and the maximum defect size could be reduced much. That is, it is found that, when the aqueous electrode paste was produced by spraying the misty aqueous solvent A31 in the diluting zone 40, the size of the microgels in the aqueous electrode paste could be reduced to an extent that quality of the aqueous electrode paste can be sufficiently secured.

Further, it is found that, as shown in FIGS. 4 and 5, in a structure where the misty aqueous solvent A31 is sprayed in the diluting zone 40, when the misty aqueous solvent A21 is sprayed also in the thickly kneading zone 30, compared with the case where the rod-like aqueous solvent A20 was charged in the thickly kneading zone 30, the maximum defect size can be reduced. This is because cellulose contained in the thickener can be slowly swollen also in the thickly kneading zone 30.

That is, according to the method for producing an aqueous electrode paste, it is preferable that, in the step of thickly kneading, the aqueous solvent A2 for thickly kneading together with the powder A1 is sprayed inside of the two-shaft kneader 1 in a misty state where an average liquid droplet diameter is 1 µm or more and an average particle diameter (D50) of the thickener or less. Further, it is preferable that the two-shaft kneader 1 is provided, in the thickly kneading zone, with the air assisted atomizer nozzle 137 (second spray) that sprays the aqueous solvent A2 for thickly kneading together with the powder A1 in a misty state where an average liquid droplet diameter is 1 µm or more and an average particle diameter (D50) of the thickener or less inside of the housing 10.

The method for producing an aqueous electrode paste of the embodiment and the two-shaft kneader 1, also in the case where an aqueous electrode paste for positive electrode is produced, in the same manner as the case where an aqueous electrode paste for negative electrode is produced, can reduce the size of microgels in the aqueous electrode paste. Therefore, the method for producing an aqueous electrode paste of the embodiment and the two-shaft kneader 1, also in the case where an aqueous electrode paste for positive electrode is produced, can improve a yield of batteries and hinder an increase in the battery resistance caused by lithium precipitation.

The air assisted atomizer nozzle 47 is not necessarily disposed in the diluting zone 40. That is, the diluting zone 40 may be provided with a nozzle that sprays a misty liquid by using pressure of the liquid. This is the same also in the case where the misty aqueous solvent A21 is sprayed in the thickly kneading zone 30.

What is claimed is:

1. A method for producing an aqueous electrode paste comprising:
    charging
        a powder made of an active material and a thickener, and
        an aqueous solvent into a two-shaft kneader, and
    thickly kneading the powder and the aqueous solvent to generate a mixture by using the two-shaft kneader; and
    a diluting step of charging an aqueous solvent into the two-shaft kneader, and
    diluting the mixture with the aqueous solvent charged into the two-shaft kneader during the diluting step by using the two-shaft kneader, wherein
        the aqueous solvent for diluting the mixture is sprayed into the two-shaft kneader as a mist of liquid droplets, where the liquid droplets of the mist have an average liquid droplet diameter that is in a range of from 1µm to a value equal to an average particle diameter (D50) of the thickener.

2. A method for producing an aqueous electrode paste comprising:
    charging
        a powder made of an active material and a thickener, and
        an aqueous solvent into a two-shaft kneader, and
    thickly kneading the powder and the aqueous solvent to generate a mixture by using the two-shaft kneader, wherein, when the mixture is generated, an aqueous solvent for thickly kneading the powder is sprayed into the two-shaft kneader as a mist of liquid droplets, where the liquid droplets of the mist have an average liquid droplet diameter that is in a range of from 1 µm to a value equal to an average particle diameter (D50) of the thickener; and
    a diluting step of charging an aqueous solvent into the two-shaft kneader, and
    diluting the mixture with the aqueous solvent charged into the two-shaft kneader during the diluting step by using the two-shaft kneader, wherein the aqueous solvent for diluting the mixture is sprayed into the two-shaft kneader as a mist of liquid droplets, where the liquid droplets of the mist have an average liquid droplet diameter that is in a range of from 1 μm to a value equal to an average particle diameter (D50) of the thickener.

3. A two-shaft kneader comprising:

a thickly kneading zone where a powder made of an active material and a thickener, and an aqueous solvent are charged inside of a hollow exterior, and, by rotating two rotary shafts the powder and the aqueous solvent are thickly kneaded to generate a mixture, wherein, the two rotary shafts are parallel to each other with a predetermined distance kept between the two rotary shafts, and the two rotary shafts are supported by the hollow exterior;

a diluting zone where an aqueous solvent is charged into the hollow exterior, and, by rotating each of the rotary shafts, the mixture is diluted with the charged aqueous solvent; and a first spray is provided inside of the diluting zone for spraying the aqueous solvent as a mist of liquid droplets into the hollow exterior for diluting the mixture, where the liquid droplets of the mist have an average liquid droplet diameter that is in a range of from 1 μm to a value equal to an average particle diameter (D50) of the thickener.

4. The two-shaft kneader according to claim 3 further comprising:

in the thickly kneading zone, a second spray for spraying an aqueous solvent as a mist of liquid droplets into the hollow exterior for thickly kneading together with the powder, where the liquid droplets of the mist have an average liquid droplet diameter that is in a range of from 1 μm to a value equal to an average particle diameter (D50) of the thickener.

* * * * *